(12) United States Patent
Springer

(10) Patent No.: US 11,831,456 B2
(45) Date of Patent: Nov. 28, 2023

(54) PREVENTING CONTENT CAPTURE WITHIN A COMMUNICATION SESSION

(71) Applicant: Zoom Video Communications, Inc., San Jose, CA (US)

(72) Inventor: Shane Paul Springer, Oregon City, OR (US)

(73) Assignee: Zoom Video Communications, Inc., San Jose, CA (US)

( * ) Notice: Subject to any disclaimer, the term of this patent is extended or adjusted under 35 U.S.C. 154(b) by 0 days.

(21) Appl. No.: 17/589,843

(22) Filed: Jan. 31, 2022

(65) Prior Publication Data

US 2023/0246867 A1 Aug. 3, 2023

(51) Int. Cl.
*H04L 12/18* (2006.01)
*G06V 30/10* (2022.01)
*G06V 10/764* (2022.01)

(52) U.S. Cl.
CPC ........ *H04L 12/1831* (2013.01); *G06V 10/764* (2022.01); *G06V 30/10* (2022.01); *H04L 12/1822* (2013.01)

(58) Field of Classification Search
CPC . H04L 12/1831; H04L 12/1822; G06V 30/10; G06V 10/764
See application file for complete search history.

(56) References Cited

U.S. PATENT DOCUMENTS

| 2008/0022002 | A1* | 1/2008 | Roberts | H04L 63/104 |
| | | | | 709/225 |
| 2012/0063573 | A1* | 3/2012 | Sylvain | H04L 65/4038 |
| | | | | 379/67.1 |
| 2014/0108288 | A1* | 4/2014 | Calman | H04N 7/155 |
| | | | | 705/342 |
| 2015/0249747 | A1* | 9/2015 | Boss | H04M 3/56 |
| | | | | 379/85 |
| 2018/0176366 | A1* | 6/2018 | Mukherjee | H04W 4/50 |
| 2019/0341050 | A1* | 11/2019 | Diamant | G06V 40/172 |
| 2020/0057866 | A1* | 2/2020 | Levy | H04L 12/1831 |

* cited by examiner

*Primary Examiner* — John A Follansbee
*Assistant Examiner* — Raqiul A Choudhury
(74) *Attorney, Agent, or Firm* — Young Basile Hanlon & MacFarlane, P.C.

(57) ABSTRACT

Methods and systems provide for preventing content capture within a communication session. In one embodiment, a method maintains a communication session with a number of participants, where session content is presented during the communication session to the participants, and where participants can request the session content to be captured for later access. The system receives or identifies one or more signals for capture prevention to be initiated for at least a portion of the session content. The system further receives, in real time during the communication session, a request from one of the participants for a current portion of session content to be captured. The system then determines, via processing of the one or more signals, that the current portion of session content is to be prevented from capture, and then prevents the current portion of session content from being captured.

18 Claims, 7 Drawing Sheets

PREVENTING CONTENT CAPTURE WITHIN A COMMUNICATION SESSION

FIELD

The present application relates generally to digital communication, and more particularly, to systems and methods for preventing content capture within a communication session.

SUMMARY

The appended claims may serve as a summary of this application.

BRIEF DESCRIPTION OF THE DRAWINGS

The present application relates generally to digital communication, and more particularly, to systems and methods providing for preventing content capture within a communication session.

The present disclosure will become better understood from the detailed description and the drawings, wherein.

DETAILED DESCRIPTION OF THE DRAWINGS

Figure 1A:
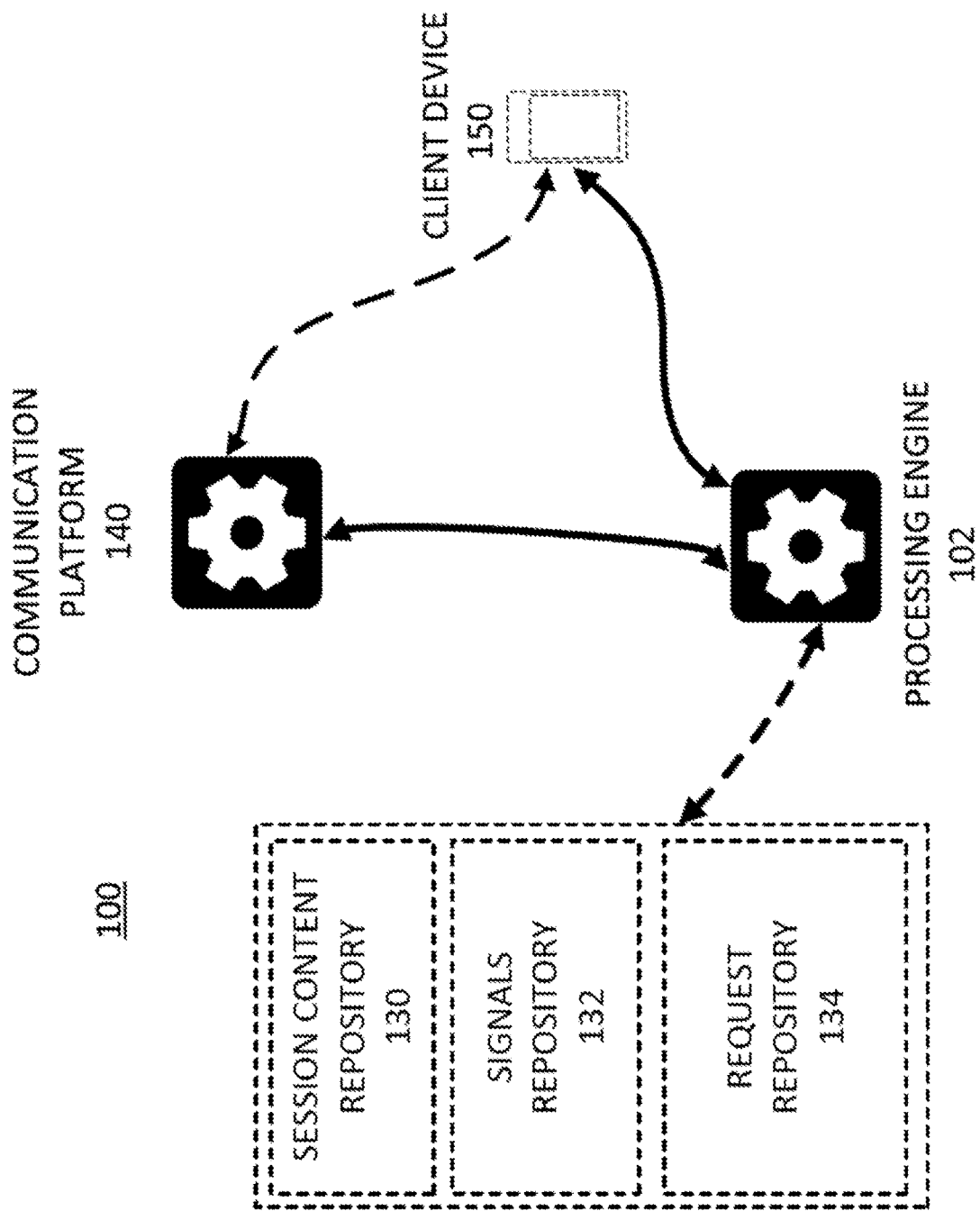
FIG. 1A is a diagram illustrating an exemplary environment in which some embodiments may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

During a remote communication session, such as a remote video presentation, participants may be inclined to take notes of certain presented information that they deem to be important or they wish to study later. Since education is increasingly taking place during remote video-based communication sessions, students will frequently want to take notes on material being presented by teachers, such as, e.g., presentation slides, spoken content, or material that the teacher writes on a physical or virtual whiteboard.

However, this process of note-taking during a communication session is often neither easy nor streamlined. For example, if a student sees a presentation slide that she wishes to save for later study, she may have to follow a number of steps, including performing a full screen capture of her computer screen, switching to the screen capture application, manually cropping the full screen capture to just the presentation slide, then copying the cropped image to her notes document. While she is performing these steps, the teacher has moved on to additional material that she has been unable to keep up with and take notes on. Even just a few seconds of such a distraction can be costly when a student needs to absorb every moment of a lecture.

One way to resolve these issues is through digital capture of notes during communication sessions. A system can dynamically generate a note with captured content from the communication session. This system can function as a dynamic clipboard by capturing previous snippets from the meeting's content, as well as potentially snippets recorded after the note request, to include in the note. The meeting content may be, e.g., presentation slides, graphs, portions of a video presentation with a presenter appearing on a live video feed, transcripts of a presenter speaking, or any other suitable content. While the meeting occurs, at least a portion of the session content can be recorded. Upon the participant interacting with the UI element, a designated portion of the session content that was just recorded is used for generating a note. This may be, for example, the previous 15 seconds of the session content. In some embodiments, additional session content after the participant selects the UI element is also recorded and used for generating the note. For example, the previous 15 seconds before the participant selecting the UI element, as well as the 15 seconds directly following the participant selecting the UI element, are captured within the note. The participant can then access and play back the note at a later time.

In many cases, however, a presenter may wish or require for a certain portion of a presentation, such as a presentation slide or a subset of presentation slides, to be prevented from capture in such a way. For example, there may be a requirement placed on a presenter or participant to prevent other parties from copying or capturing certain content. This may be the case with, for example, material which has copyright restrictions placed on it, material that is confidential or subject to a non-disclosure agreement, or otherwise protected material which should not be copied, distributed, or otherwise taken outside of the communication session. While capturing content from a communication session may be possible, there is no simple way to effectuate capture prevention for at least a subset of that content within the session.

Thus, there is a need in the field of digital communication tools and platforms to create new and useful systems and methods for preventing content capture within a communication session, and in particular, enabling presenters to have control over capture of their content in a selective fashion. In systems where meeting notes that include clips of audio and/or video may be captured to cloud storage connected to the communication platform, presenters may be given the ability to, for example, present confidential content by allowing capturing of audio and video of that presenter while prohibiting capture of the presented slides and/or other presented content. As another example, a presenter may have twenty slides, with five of the slides containing sensitive data which must be protected. Such a presenter can selectively prohibit capture of the five slides containing sensitive data, while allowing capture of the remaining slides.

In some embodiments, while a given user may have one or more additional methods of capturing the content outside of the platform's capture tools—such as, e.g., taking a picture with their phone, or using screenshot tools external to the platform—the systems and methods improve the current state of communication platforms by providing a solution for preventing capture of sensitive, confidential, secret, and/or protected information, data, and media which a user attempts to initiate via the platform's capture tools. This also includes preventing the capture and storage of such content in a cloud storage location connected to the communication platform.

In one embodiment, a method maintains a communication session with a number of participants, where session content is presented during the communication session to the participants, and where participants can request the session content to be captured for later access. The system receives or identifies one or more signals for capture prevention to be initiated for at least a portion of the session content. The system further receives, in real time during the communication session, a request from one of the participants for a current portion of session content to be captured. The system then determines, via processing of the one or more signals, that the current portion of session content is to be prevented from capture, and then prevents the current portion of session content from being captured.

Within various embodiments, users may be able to add metadata to, e.g., slides, videos, text, pictures, spoken content, and more. This may be done by, e.g., selecting a button that toggles an increased security protocol, or speaking specific words that invoke the increased security protocol. Such metadata can thus signal the increased protocols to be activated. In some embodiments, the specific protocols can potentially be configurable. For example, the protocols can be configured to, e.g.: prevent certain content from being stored in a cloud location as part of a note-taking or note generation functionality; prevent certain content from being "screenshotted" internally (i.e., captured as a screenshot using an internal platform tool); prevent certain content from being stored as part of a transcript; preventing certain content from being screenshotted externally by, e.g., adding non-visible distortion to video and/or pictures; or any other suitable way of preventing capture of content within the system.

Further areas of applicability of the present disclosure will become apparent from the remainder of the detailed description, the claims, and the drawings. The detailed description and specific examples are intended for illustration only and are not intended to limit the scope of the disclosure.

FIG. 1A is a diagram illustrating an exemplary environment in which some embodiments may operate. In the exemplary environment 100, a client device 150 is connected to a processing engine 102 and, optionally, a communication platform 140. The processing engine 102 is connected to the communication platform 140, and optionally connected to one or more repositories and/or databases, including, e.g., session content repository 130, signals repository 132, and/or a request repository 134. One or more of the databases may be combined or split into multiple databases. The user's client device 150 in this environment may be a computer, and the communication platform 140 and processing engine 102 may be applications or software hosted on a computer or multiple computers which are communicatively coupled via remote server or locally.

The exemplary environment 100 is illustrated with only one client device, one processing engine, and one communication platform, though in practice there may be more or fewer additional client devices, processing engines, and/or communication platforms. In some embodiments, the client device(s), processing engine, and/or communication platform may be part of the same computer or device.

Figure 2:
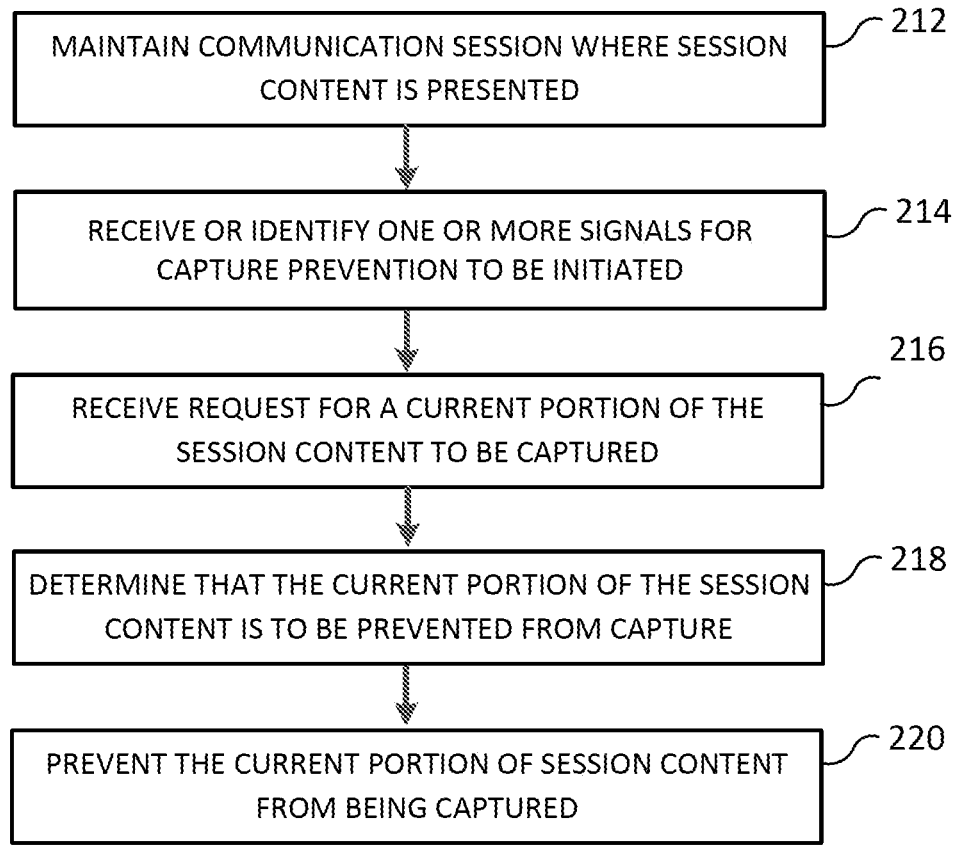
FIG. 2 is a flow chart illustrating an exemplary method that may be performed in some embodiments.

In an embodiment, the processing engine 102 may perform the exemplary method of FIG. 2 or other method herein and, as a result, prevent content capture within a communication session. In some embodiments, this may be accomplished via communication with the client device, processing engine, communication platform, and/or other device(s) over a network between the device(s) and an application server or some other network server. In some embodiments, the processing engine 102 is an application, browser extension, or other piece of software hosted on a computer or similar device, or is itself a computer or similar device configured to host an application, browser extension, or other piece of software to perform some of the methods and embodiments herein.

The client device 150 is a device with a display configured to present information to a user of the device who is a participant of the video communication session. In some embodiments, the client device presents information in the form of a visual UI with multiple selectable UI elements or components. In some embodiments, the client device 150 is configured to send and receive signals and/or information to the processing engine 102 and/or communication platform 140. In some embodiments, the client device is a computing device capable of hosting and executing one or more applications or other programs capable of sending and/or receiving information. In some embodiments, the client device may be a computer desktop or laptop, mobile phone, virtual assistant, virtual reality or augmented reality device, wearable, or any other suitable device capable of sending and receiving information. In some embodiments, the processing engine 102 and/or communication platform 140 may be hosted in whole or in part as an application or web service executed on the client device 150. In some embodiments, one or more of the communication platform 140, processing engine 102, and client device 150 may be the same device. In some embodiments, the user's client device 150 is associated with a first user account within a communication platform, and one or more additional client device(s) may be associated with additional user account(s) within the communication platform.

In some embodiments, optional repositories can include a session content repository 130, signals repository 132, and/or request repository 134. The optional repositories function to store and/or maintain, respectively, recordings of and/or information on session content; signals that are received or identified for capture prevention of portions of session content within communication sessions; and requests for content capture from participants of the communication session. The optional database(s) may also store and/or maintain any other suitable information for the processing engine 102 or communication platform 140 to perform elements of the methods and systems herein. In some embodiments, the optional database(s) can be queried by one or more components of system 100 (e.g., by the processing engine 102), and specific stored data in the database(s) can be retrieved.

Communication platform 140 is a platform configured to facilitate meetings, presentations (e.g., video presentations) and/or any other communication between two or more parties, such as within, e.g., a video conference or virtual classroom. A video communication session within the communication platform 140 may be, e.g., one-to-many (e.g., a participant engaging in video communication with multiple attendees), one-to-one (e.g., two friends remotely communicating with one another by video), or many-to-many (e.g., multiple participants video conferencing with each other in a remote group setting).

Figure 1B:
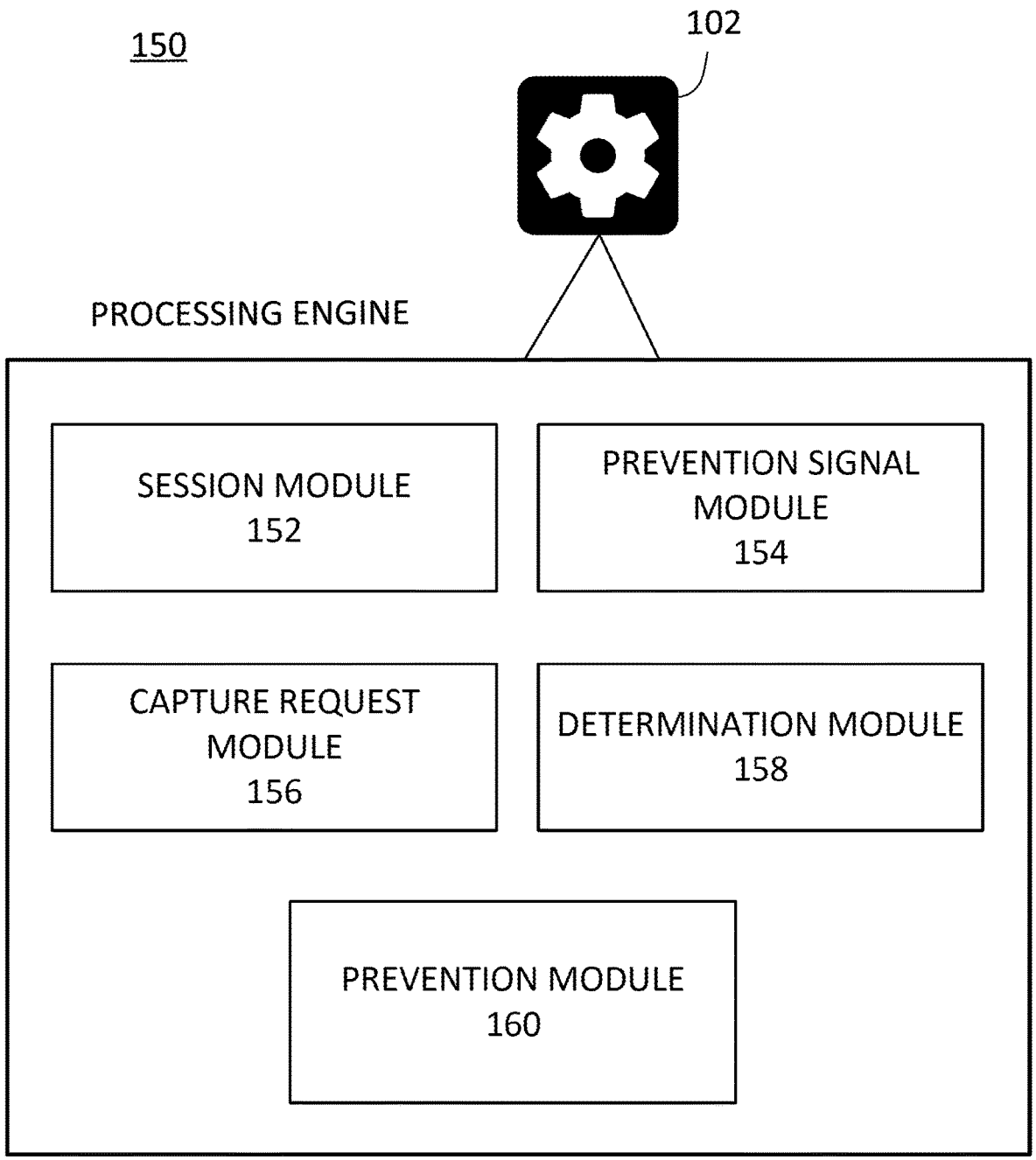
FIG. 1B is a diagram illustrating an exemplary computer system that may execute instructions to perform some of the methods herein.

FIG. 1B is a diagram illustrating an exemplary computer system 150 with software modules that may execute some of the functionality described herein. In some embodiments, the modules illustrated are components of the processing engine 102.

Session module 152 functions to maintain a communication session with a plurality of participants, wherein session content is presented during the communication session to the number of participants, and wherein participants can request the session content to be captured for later access.

Prevention signal module 154 functions to receive or identify signals for capture prevention to be initiated for at least a portion of the session content.

Capture request module 156 functions to receive a request from one of the participants for a current portion of session content to be captured.

Determination module 158 functions to determine that the current portion of session content is to be prevented from capture.

Prevention module 160 functions to prevent the current portion of session content from being captured.

The above modules and their functions will be described in further detail in relation to an exemplary method below.

FIG. 2 is a flow chart illustrating an exemplary method that may be performed in some embodiments.

At step 212, the system maintains a communication session with a number of participants, wherein session content is presented during the communication session to the participants, and wherein participants can request the session content to be captured for later access The communication session can include session content in a number of potential ways. In some embodiments, the session content is presentation content presented by one or more presenting participants. For example, a presenter can present a number of presentation slides during the communication session. The presenter can also speak as he presents each slide, and potentially appear on video as well. In some embodiments, one or more presenters can present a prepared video while speaking. Other possibilities may include a presenter presenting a document such as a PDF or Word document, a presenter sharing his screen while talking, or a presenter drawing on a virtual whiteboard as he speaks. In some embodiments, rather than one or more presenters presenting material, the session content can include video, audio, or images from a number of participants as they discuss something, or engage in question-and-answer sessions. In some embodiments, audio and/or video streams of the one or more presenting participants can be included. In some embodiments, a portion of a transcript from the communication session can be included. This transcript may be automatically generated during the communication session, then included as session content. Many other such possibilities may be contemplated.

In some embodiments, the system maintains the communication session by connecting participants to a live communication stream via their respective client devices. The communication stream may be any "session" (such as an instance of a video conference, webinar, informal chat session, or any other suitable session) initiated and hosted via the communication platform, for remotely communicating with one or more users of the communication platform, i.e., participants within the communication session. Participants are connected on user devices, and are associated with user accounts within the communication platform.

In some embodiments, the UI for the communication session is displayed on the client device of each participant. In some embodiments, the UI appears different for different participants, or has different UI elements included for different participants depending on their user permissions, access levels (e.g., a premium-tier business user account as compared to a free-tier user account), or other aspects that may differentiate one participant from another within the communication platform. In various embodiments, the UI is configured to allow the participant to, e.g., navigate within the communication session, engage or interact with one or more functional elements within the communication session, control one or more aspects of the communication session, and/or configure one or more settings or preferences within the communication session.

In some embodiments, the system receives a number of video feeds depicting imagery of a number of participants, the video feeds each having multiple video frames. In some embodiments, the video feeds are each generated via an external device, such as, e.g., a video camera or a smartphone with a built-in video camera, and then the video content is transmitted to the system. In some embodiments, the video content is generated within the system, such as on a participant's client device. For example, a participant may be using her smartphone to record video of herself giving a lecture. The video can be generated on the smartphone and then transmitted to the processing system, a local or remote repository, or some other location. In some embodiments, one or more of the video feeds are pre-recorded and are retrieved from local or remote repositories. In various embodiments, the video content can be streaming or broadcasted content, pre-recorded video content, or any other suitable form of video content. The video feeds each have multiple video frames, each of which may be individually or collectively processed by the processing engine of the system.

In some embodiments, the video feeds are received from one or more video cameras connected to a client device associated with each participant. Thus, for example, rather than using a camera built into the client device, an external camera can be used which transmits video to the client device, or some combination of both.

In some embodiments, the participants are users of a communication platform, and are connected remotely within a virtual communication room generated by the communication platform. This virtual communication room may be, e.g., a virtual classroom or lecture hall, a group room, a breakout room for subgroups of a larger group, or any other suitable communication room which can be presented within a communication platform. In some embodiments, synchronous or asynchronous messaging may be included within the communication session, such that the participants are able to textually "chat with" (i.e., sends messages back and forth between) one another in real time.

In some embodiments, the UI includes a number of selectable UI elements. For example, one UI may present selectable UI elements along the bottom of a communication session window, with the UI elements representing options the participant can enable or disable within the video session, settings to configure, and more. For example, UI elements may be present for, e.g., muting or unmuting audio, stopping or starting video of the participant, sharing the participant's screen with other participants, recording the video session, and/or ending the video session.

In some embodiments, one or more UI elements may be present for taking a note. For example, a button may appear within the UI that reads "Take a Note." Upon the user clicking on the button or otherwise interacting with it, a request is initiated for the system to generate a note at that time. The system can then generate a note, which will be described in further detail below. An example of a UI element for taking a note will be discussed below with respect to FIG. 3.

In some embodiments, at least a portion of the UI displays a number of participant windows. The participant windows correspond to the multiple participants in the video communication session. Each participant is connected to the video communication session via a client device. In some embodiments, the participant window may include video, such as, e.g., video of the participant or some representation of the participant, a room the participant is in or a virtual background, and/or some other visuals the participant may wish to share (e.g., a document, image, animation, or other visuals). In some embodiments, the participant's name (e.g., real name or chosen username) may appear in the participant window as well. One or more participant windows may be hidden within the UI, and selectable to be displayed at the user's discretion. Various configurations of the participant windows may be selectable by the user (e.g., a square grid of participant windows, a line of participant windows, or a single participant window). In some embodiments, the participant windows are arranged in a specific way according to one or more criteria, such as, e.g., current or most recent verbal participation, host status, level of engagement, and any other suitable criteria for arranging participant windows. Some participant windows may not contain any video, for example, if a participant has disabled video or does not have a connected video camera device (e.g. a built-in camera within a computer or smartphone, or an external camera device connected to a computer).

In some embodiments, the system generates notes by recording session content which is to be included in the notes. In some embodiments, the system records by writing or overwriting a recording buffer with portions of the session content while the communication session is underway. This is performed in real time during the communication session, and the writing or overwriting is done continually during the communication session. Upon the recording buffer being written to capacity, the recording buffer can be configured to be overwritten with portions of the session content such that session content is always being recorded to the buffer, regardless of its size. In some embodiments, the recording buffer is located on the local client device of each participant, such that the recording is performed locally to the client device. In other embodiments, the buffer is located remotely, such as on a remote cloud data server.

In various embodiments, the recording buffer may potentially be any buffer with any possible amount of storage space allocated to that buffer. In some embodiments, the buffer is configured to record audio, video, image captures, or any other media. In some embodiments, multiple buffers are used individually or in combination to record media. For example, one buffer may be used to record only audio, another buffer may record only video, and yet another buffer may only contain captured images. In some embodiments, the buffer may include time stamps or may be synced in time with the duration of the communication session.

In one example, a local buffer with 500 MB allocated to it continually records audio and video of session content occurring during the communication session to a local client device of a participant. Upon the 500 MB capacity being reached, the buffer begins overwriting previously recorded content with session content as it is being produced. The buffer continually overwrites itself with new session content during the full duration of the communication session, and ends recording only once the communication session has terminated.

In some embodiments, the recorded session content includes only portions of presentation content and portions of audio and/or video streams of the one or more presenting participants, and do not include any portions of audio and/or video streams from non-presenting participants. This ensures, for example, that only the presenter(s) will be recorded for the purpose of generating notes, and never the attendees who will be recorded. In some embodiments, audio and/or video which includes non-presenting participants can be redacted or removed from the recorded session content. For example, blocks of audio where a non-presenting participant asks a question can be "bleeped", i.e., the audio of that participant is replaced with a single tone, white noise, silence, or similar replacement. Similarly, blocks of video that include a non-presenting participant can be replaced by a black screen, a replacement image, blurred video, or similar. In some embodiments, such blocks may simply be skipped and not included in the recording, or included in the recording but not included in a note to be generated.

In some embodiments, the system can receive a request from one of the participants to generate a note. In some embodiments, this request is received concurrently to the recording of the session content. In some embodiments, this request to generate a note is initiated by the participant interactively selecting a UI element for taking a note. For example, a button in the lower right corner of the UI shown to the participant may read "Take a Note." Upon the user selecting that button, the system receives a request from that participant to generate a note during that time. Such an example will be further described below with respect to FIG. 3.

In some embodiments, the system receives an indication that a request to generate a note has been received from at least one participant of the communication session. The system then displays a notification within the UI of one or more additional participants that the first participant has requested a note to be generated for the current session content. For example, upon Anna requesting a note to be generated, other participants can receive a notification within the UI that Anna took a note on this material. Alternatively, rather than the notification including Anna's name, it may simply note that one participant has taken a note on the material. In some embodiments, rather than notifying when a single participant has taken a note, the system may notify only when a threshold number of participants taking notes has been exceeded.

In some embodiments, the system may be configured to detect one or more automated note taking conditions. The system may then automatically initiate the request to generate the note on behalf of the participant upon the detecting of the automated note taking condition(s). In this way, notes can be automatically generated for participants without them needing to select a note taking UI element. In some embodiments, the specific automated note taking conditions can be selected, customized, or adjusted by the participant in a settings, preferences, or options UI. Some examples of automated note taking conditions can include, e.g., the system receiving an indication of a number of participants exceeding a threshold requesting a note to be generated; the system receiving an indication or cue that the presenter considers the material to be noteworthy or otherwise indicates that the material should be captured by students; the system receiving an indication that one or more key words or phrases have been detected in the session content; the system receiving an indication that the participant's immediate supervisor or superior is speaking or presenting; or any other suitable conditions which may trigger the automatic generation of a note in a session.

In some embodiments, upon receiving a request to generate a note, the system can generate a note including at least a designated portion of the session content recorded prior to or at the moment of receiving the request. In some embodiments, the generated note is associated specifically with the requesting participant who requested the note to be generated, and remains connected to that participant's account or user profile within the communication platform for future playback and access. The designated portion of the session content to be included in the note is designated based on a prespecified amount or window of time in which recorded content is to be included. For example, a note may be generated 13 minutes into the communication session. If the prespecified amount of time for recorded content to be included is 30 seconds prior to the request to generate the note is received, then 30 seconds of recorded session content prior to receiving the request is included in the generated note. Therefore, content from 12:30 to 13:30 of the communication session is included in the note, resulting in a note with 1 minute of recorded session content.

In some embodiments, the note that is generated can additionally include a portion of a generated transcript that corresponds to or is time-synced with the designated portion of the session content to be included. In some embodiments, the system generates, in real time, a transcript for the session content as it is being produced within the communication session. The note the system generates then includes a subset of the generated transcript for the session content that corresponds to the portion of the session content in the note.

In some embodiments, when generating the note, the system automatically crops one or more visual portions of the designated recorded session content to remove one or more UI elements visible in the designated session content. For example, the system can crop out portions of the recording which include participant windows with audio or video feeds from non-presenting participants. The system can also crop out all participant windows to include only presentation content without any live video streams of presenting or non-presenting participants. UI elements can also be cropped out. Many other such possibilities for cropping out content can be included.

In some embodiments, after receiving the request to generate the note, the system continues to record portions of the session content. The note generated by the system additionally include a designated portion of the recorded session content after receiving the request. For example, in addition to 30 seconds of previous session content material being included in the generated note, an additional 30 seconds of material after the request is received is included. That is, after receiving the request, 30 more seconds of material is recorded, then the note is generated to include both 30 seconds of recorded material prior to the request being received, and 30 seconds of recorded material after the request is received. In this way, participants may have the benefit of a captured note which includes a full context of the material before and after the participant's decision to take a note, thus ensuring no important material has been missed.

In some embodiments, the designated portion of the session content to be included in the note is configured to be adjustable by one or more participants with granted permission. In some embodiments, the designated portion can be adjusted in a settings, preferences, or options UI prior to the note being generated. For example, either during a communication session or at a time prior to the communication session, the participant can navigate within a UI to a settings UI to configure a number of settings for communication sessions. One of the options for configuration within the settings UI can be an option to adjust the amount of time of recording to be included when taking a note. In varying embodiments, the amount of time to be adjusted can correspond to the amount of recorded material to include from prior to the participant requesting the note; the amount of recorded material to include from after the participant requests the note; or both. The system then uses these adjustments as the new designated portion of the session content to be included in the note.

In some embodiments, prior to the note being generated by the system, a note UI is presented to the participant. The note UI includes a number of selectable options which determine the content of the note to be generated. In some embodiments, the note UI includes a selectable UI element which allows the user to adjust the amount of time of recording to be included when taking the note, which determines the designated portion of recorded material to be included, as described above. In some embodiments, the note can be categorized into one or more categories. For example, the participant can categorize the note as one or more of: an action item, an observation, or a reference. In some embodiments, one or more annotations can be added by the participant to the note. For example, a participant may be able to type some annotations which appear alongside the session content, which can be notes to oneself about the material. In some embodiments, notes can be customized in any of a number of additional ways, such as, e.g., selecting whether to include only audio, only video, only image captures, only a transcript, or some combination thereof. Many other such customizations or additions to the note can be contemplated for inclusion within a note UI. An example of a note UI will be described below with respect to FIG. 4.

In some embodiments, the system provides access to the requesting participant to the portion of the session content in the note upon demand. In some embodiments, the access is provided even while the current communication session is still in progress, so a participant can access and review note material during the communication session if needed. In other embodiments, access is provided only after the communication session has completed. In some embodiments, access is provided both during the communication session, and after the communication session has completed. The access is offered "upon demand" in the sense that the UI presented to the participant provides a selectable UI element which allows the participant to access past generates notes whenever the user likes.

In some embodiments, access can be provided in the form of exporting the generated note to one or more playback formats which can be stored on a local client device of the participant. For example, an MP4 video file may be automatically generated on a remote server, and provided for download by the participant for offline viewing whenever the user wishes. Similarly, a number of images corresponds to visual slides presented during the communication session may be provided for the participant to download and store on their local device.

In some embodiments, access can be provided in the form of a note playback UI which is presented to the requesting participant. This note playback UI can be presented upon the participant selecting a UI element for playing back previously generated notes. In some embodiments, the note playback UI can include one or more selectable options for accessing or initiating playback of portions of the session content in the generated note, or one or more previously generated notes associated with the participant. In some embodiments, the note playback UI can include access to previously generated notes from the current communication session, previously generated notes from previous communication sessions, or both. In some embodiments, selectable options for accessing or initiating playback of portions of the session content in the note or previously generated note(s) can include one or more of, e.g.: playing back session content at an adjusted rate of speed; displaying a generated transcript alongside session content; displaying a captured visual slide alongside session content; displaying one or more participant annotations alongside session content; or any other suitable selectable options for playback or access. In some embodiments, the note playback UI can include one or more search UI elements configured to enable the participant to search for previously generated notes to be accessed or played back. Such search functionality can potentially include searching within a title of a note, searching within annotations for the note, searching within a transcript included within the note, searching within included session content itself, or other suitable options for searching for notes.

In some embodiments, the system receives an indication that a number of requests to generate a note have been received from participants that exceeds a threshold number of requests within a designated window of time. For example, the system may receive an indication that over 10 participants in a class have requested a note to be generated within the timeframe of 13 minutes to 13:30 minutes into the communication session, representing a designated window of 30 seconds in which a threshold of 10 requests has been exceeded. Upon the system receiving this indication, but prior to receiving the request to generate the note from the participant in step 216, the system can display a recommended action within the UI for the participant. This recommended action can be a notification or message which appears within the UI, recommending the participant to pay attention to or request a note for the session content currently being produced within the communication session. In some embodiments, the recommended action can include the number of other participants who have requested a note during the designated window of time, or simply inform the participant that a large number of participants have requested a note. This recommended action may be intended to encourage the participant to take a note on the material being presented, because it may be deemed important by other participants. For example, other classmates might find this particular session content in the lecture to be noteworthy. In some embodiments, after the participant requests a note to be generated, the UI might inform the participant that other participants also requested a note during that window of time.

At step 214, the system receives or identifies one or more signals for capture prevention to be initiated.

In some embodiments, the one or more signals specify that at least a portion of the session content comprises one or more presentation slides to be prevented from capture on a per-slide basis. For example, a presenting participant may be presenting a series of presentation slides, and may indicate via one or more signals that specific slides are to be prohibited from capture. In various embodiments, this may be done by, for example, metadata specified within the slide presentation, a predefined or user-submitted graphic in particular slides which are to be prohibited, audio prompts from the speech of the presenting participant indicating certain slides are to be prohibited, or any other suitable signals indicating capture should be prevented in certain ways.

In some embodiments, the system identifies and classifies, via one or more artificial intelligence (AI) models, one or more indicators in the session content. In various embodiments, the indicator(s) may include one or more of, e.g., metadata, video, image, text, speech, and/or audio data. In some embodiments, an indicator may be a glyph, symbol, or similar graphical indicator. In some embodiments the indicator may be selected by default, while in others it may be selected from a list of prespecified indicators. In some embodiments, the indicator may be user-submitted at a previous time. For example, a participant may upload an indicator and configure settings for that indicator to signal prevention of content capture, and may also specify particular settings for how that capture prevention should be handled.

In some embodiments, the one or more AI models may include one or more machine learning (hereinafter "ML") models, machine vision (hereinafter "MV") or computer vision models, natural language processing (hereinafter "NLP") models, or any other suitable AI model. In various embodiments, such an AI model may be trained or pre-trained, and may include supervised or unsupervised learning techniques.

In some embodiments, the one or more AI models are trained to determine that the one or more indicators represent the one or more signals that capture prevention should be initiated. In some embodiments, the AI models may be pretrained to determine whether a recognized visual, audio, text, or other object within the visual and/or content of the session is to be classified as a signal to initiate capture prevention. Training data for such an AI model may include, e.g., previous communication sessions in which the presenting participant has presented in the past, previous communication sessions where team members have presented in the past, previous communication sessions where the AI has determined that a signal to initiate capture prevention was present, or similar such data which can be used for training an AI model.

In some embodiments, at least one of the indicators is a digital watermark, or one or more properties associated with a portion of image, video, and/or audio content. A digital watermark may be perceivable by other participants within the slide, or may be at least minimally perceivable. In some embodiments, at least one of the indicators is a graphic which has been selected by a user from one or more predefined graphic options. In some embodiments, at least one of the indicators is a user-submitted graphic. For example, a presenting participant may have submitted a custom graphic to be used as an indicator to prohibit capture of a slide when it is used in one corner of a slide within slide decks. The user can configure the properties, behavior, and/or other aspects of such a user-submitted graphic and which specific signals it is configured to send with respect to preventing content capture.

In some embodiments, the one or more AI models may identify a prespecified bounding box or border within the session content. For example, a custom border map may be employed. The AI models can be trained to recognize this custom border, and further can be trained upon recognizing the border to redact the area inside of the border, regardless of what content is within it. In this way, users can be allowed to selectively prevent capture of protected, sensitive, or confidential content by placing it within the border map or bounding box.

In some embodiments, a pixel map may be recognized as an indicator. For example, within an image being presented in a communication session, one or more small sets of pixels may appear in certain regions, such as, e.g., 5 pixels placed in the left corner of the image as well as 10 pixels placed in the right corner of the image. In some embodiments, this pixel map may be overlaid on the image, rather than part of the image itself. Such a pixel map may be discernable to an MV model or other AI model, but minimally perceivable by participants within the session.

In some embodiments, at least one of the indicators is an audio-based prompt from a participant. In some embodiments, the one or more AI models may identify the audio-based prompt by: monitoring speech content within the session to identify speech which represents a signal to initiate capture prevention, or otherwise indicates that the current portion of the session content is confidential, sensitive, and/or protected; associating the speech with the participant; and determining that the participant is authorized to prevent capture of the current portion of the session content. For example, an AI model may continually monitor the audio of the session, and may determine that the presenting participant has spoken the words, "This slide is confidential." The sentence is parsed as indicative of a signal to prevent capture for the currently presented slide, and the system recognizes that the presenting participant is authorized to initiate preventing of content capture. As another example, an administrator of the session may say "the next 3 slides are for private, internal use only", which may be recognized as speech which indicates that some portion, specifically the next 3 slides to be presented, contains sensitive, confidential, and/or protected material. The administrator is determined by the system to be authorized to prevent capture of this particular content.

In some embodiments, at least one of the indicators is a pixel map overlaid on presented image and/or video content.

In some embodiments, at least one of the indicators is a pixel map overlaid on presented image and/or video content. In one example, the system may be configured to place a small number of pixels (e.g., five pixels) in a left corner of a presented image, and a small number of pixels (e.g., ten pixels) in a right corner of the presented image. In some embodiments, the pixels are overlaid on the image, rather than part of the image, e.g., they are part of a separate layer within the presented session. This pixel map may be discernable to machine vision models which are trained to recognize and classify such pixel maps, while being minimally perceivable to participants within the session.

In some embodiments, the one or more signals function to indicate that this particular portion of the session content is not to be recorded or is not to be included within any generated notes. For example, a glyph or other data may be recognized by the system as a signal which indicates that there is a copying restriction on this material for purposes of preserving and enforcing copyright restrictions for the material. In some embodiments, such a glyph can be in the form of a QR code. In some embodiments, such an indication may be applied to an entire meeting. The system is capable of recognizing this restrictive data and following the instructions to not record the portion of the session content or the meeting's entire session content, or to record but not include the session content within any generated notes, for example. In one example, restrictive data in the form of a QR code appearing within presentation slides may indicate that the system is not to record the presentation slides. Resulting generated notes will thus not contain the presentation slides, but will still include video and audio from the presenting speaker. In some embodiments, a glyph, image, text, metadata, or other data can additionally or alternatively be recognized by the system which instructs the system to not allow a note for the image, or to allow only a note with one or more restrictions applied, such as, e.g., 10 seconds or less of a specific piece of copyrighted material may be included within a note, but not more than 10 seconds.

In some embodiments, the one or more signals may indicate that one or more pieces of session content are to be automatically identified and flagged within the system, and one or more actions are to be automatically performed by the system with respect to that content. Content may be identified and flagged, for example, for constituting problematic, inappropriate, or illegal content, copyrighted content for which the copyrights do not include, e.g., permission to distribute or produce derivative works, or any other content. In various embodiments, the pieces of session content may be identified and flagged by the system and/or one or more connected systems via, for example, an Application Programming Interface (API). In some embodiments, one or more machine learning models may be employed to perform the identification and flagging of the session content.

In some embodiments, the system receives a signal that a currently presenting participant, a host, or an administrator of the communication session has sent a message to a chatbot pertaining to capture prevention within the communication session. For example, a presenting participant may wish to prevent capture of a particular slide that is being presented, but has not prepared any graphic for the slide to indicate prevention should be initiated, nor has the presenter prepared any metadata nor set up audio-based prompts to prevent capture. The presenting participant may quickly move to a chat window of the communication session and send a message to a chatbot dedicated at least partly to the purpose of receiving requests to prevent capture and processing them to be accepted and initiated. For example, the participant may type a shortcut command, such as "/p" to the chatbot to quickly toggle a private or secured content mode in which no content may be captured. In another example, the participant may type "slides 9-12" to the chatbot, which recognizes that slides 9 through 12 of the currently presented presentation should be prevented from capture.

In some embodiments, the system receives a signal that a currently presenting participant, a host, or an administrator of the communication session has toggled a UI element to initiate a "secured content mode," or "private mode," for the communication session. In some embodiments, this secured content mode is configured such that when it is active, session content as a whole is prevented from being captured. This capture prevention of any currently presented material remains in place until the communication session ends, or the currently presenting participant, host, or administrator toggles the UI element once more to deactivate the secured content mode. In some cases, users may opt to use this mode for prevention capture of specific material or an entire presentation, rather than sending other signals such as, e.g., embedding a graphic within slides.

In some embodiments, when the secured content mode is active, the system can be instructed to additionally or alternatively "lock" the communication session, such that no new participants may join. This may have the effect of securing the content in additional ways by not allowing unsecured (i.e., unvetted or unverified) participants from having access to private, protected, or confidential material. The locking of the communication session may be toggled on or off by toggling the secured content mode on or off, or in some embodiments, a separate toggle UI element may be presented to allow for locking or unlocking to be initiated. In some embodiments, users may be allowed to configure settings for the secured content mode such as, e.g., configuring whether to include locking when toggling the mode on or off, configuring which users are authorized to activate and/or deactivate the mode, configuring rules for automatic activation or deactivation of the mode under various criteria or circumstances, and more.

In some embodiments, users may additionally be enabled to toggle or activate a setting which delineates whether capture should be prevented for participants and other parties internal to the user's associated organization, external to the user's associated organization, or both. In various embodiments, this delineation may be configured in a settings or configuration section, via a toggle UI element or other UI element, or as part of the secured content mode functionality. In some embodiments, when external users are prevented from capturing content, the content would only be allowed to be captured by users who are logged into the communication platform and are verified to be a part of the user's organization's account. In some embodiments, external users may additionally be prevented from viewing or accessing content, not just be prevented from capturing content.

In some embodiments, at least a subset of the signals may be instructions for the system to perform one or more real-time optical character recognition (hereinafter "OCR") techniques. These techniques can function to recognize optical characters, including text, which is displayed within a video or image being streamed or otherwise presented as session content within the communication session. For example, text from slides may be recognized using OCR techniques in real time while the communication session is underway. In some embodiments, the signals may further instruct the system to perform OCR on the session content to recognize one or more textual keywords. Textual keywords may be one or more words, phrases, or characters which, when presented, provide an instruction to prevent capture of at least a portion of the session content. For example, if a slide includes the keyword phrase "capture prohibited," the system may be instructed to prevent capture for that particular slide. In some embodiments, one or more prespecified keywords may be used as keywords, while in some embodiments, users may specify or configure custom keywords to be used.

In some embodiments, the system receives one or more user preferences which configure one or more applications for capture prevention on a per-application basis. Such user preferences may be configured by a user within a UI window or subsection for user preferences, settings, or configuration. In some embodiments, this allows for different applications which integrate with, embed, or utilize aspects of the communication session to have customized settings for capture prevention. For example, a user may wish for prevention capture settings to always be turned on during work-specific, enterprise applications such as a calendar application, email application, or other suitable applications in which additional security or confidentiality may be desired, while allowing capture to occur for non-work applications.

At step 216, the system receives a request for a current portion of the session content to be captured.

In some embodiments, the system receives a request from one of the participants to generate a note or similarly request capture within the platform's tools and functionality. In some embodiments, this request is received concurrently to session content being recorded. In some embodiments, this request is received concurrently to one or more recording buffer(s) being written or overwritten with session content. In some embodiments, this request to generate a note is initiated by the participant interactively selecting a UI element for taking a note. For example, a button in the lower right corner of the UI shown to the participant may read "Take a Note". Upon the user selecting that button, the system receives a request from that participant to generate a note during that time. Such an example will be further described below with respect to FIG. 3.

In some embodiments, the system receives an indication that a request to generate a note has been received from at least one participant of the communication session. The system then displays a notification within the UI of one or more additional participants that the first participant has requested a note to be generated for the current session content. For example, upon Anna requesting a note to be generated, other participants can receive a notification within the UI that Anna took a note on this material. Alternatively, rather than the notification including Anna's name, it may simply note that one participant has taken a note on the material. In some embodiments, rather than notifying when a single participant has taken a note, the system may notify only when a threshold number of participants taking notes has been exceeded.

In some embodiments, the system may be configured to detect one or more automated note taking conditions. The system may then automatically initiate the request to generate the note on behalf of the participant upon the detecting of the automated note taking condition(s). In this way, notes can be automatically generated for participants without them needing to select a note taking UI element. In some embodiments, the specific automated note taking conditions can be selected, customized, or adjusted by the participant in a settings, preferences, or options UI. Some examples of automated note taking conditions can include, e.g., the system receiving an indication of a number of participants exceeding a threshold requesting a note to be generated; the system receiving an indication or cue that the presenter considers the material to be noteworthy or otherwise indicates that the material should be captured by students; the system receives an indication that one or more key words or phrases have been detected in the session content; the system receives an indication that the participant's immediate supervisor or superior is speaking or presenting; or any other suitable conditions which may trigger the automatic generation of a note in a session.

In some embodiments, a capture duration for the portion of the session content requested to be captured can be one of: a predefined capture duration; a capture duration which is determined based on the content; or a capture duration which is user-defined by one or more authorized participants. For example, a participant requesting a current portion to be captured may initiate the request based on a default duration requested to be captured. Alternatively, the user may select a duration, such as 1 minute before the request is made, or 3 minutes before and after the request is made. Alternatively, one or more AI models may determine a capture duration to be applied based on the content and one or more criteria, such as, e.g., whether slides are being presented and the length of presentation for one or more slides; whether speech content is determined to digress from a presented topic or a non-presenting participant asks a question or otherwise interjects; or other suitable criteria for determining a duration.

At step 218, the system determines that the current portion of the session content is to be prevented from capture.

In some embodiments, this determination involves determining whether there is a match between the received signal(s) indications about which portions of the session content should be prevented from capture, and the current portion of session content. If the signals indicate that the current portion is included in the portions to be prevented from capture, then the system determines that the current portion is to be prevented from capture. For example, if a signal includes preventing capture of all slides which have a certain glyph visible in the upper left corner, and the current portion of content is a slide with a glyph in the upper left corner, then that current portion of content is determined by the system to be prevented from capture.

In some embodiments, the system makes this determination in part by classifying, via one or more AI models (e.g., ML, MV, or any other suitable AI model), the current portion of session content as sensitive or protected content. In some embodiments, at least a subset of the AI models may be trained to perform the classification of content as sensitive/protected or not sensitive/protected content. In some embodiments, the training data for the AI models may include a large amount of session content from previous sessions, in, e.g., audio form, transcript form, or some other form. In some embodiments, the training data may be labeled or annotated in some way.

At step 220, the system prevents the current portion of session content from being captured. In some embodiments, the system prevents capture even while the current communication session is still in progress. In some embodiments, capture is prevented and access is prohibited both during the communication session, and after the communication session has completed.

In some embodiments, access can be prevented in the form of restricting exporting of the generated note to one or more playback formats and preventing storage of any capture data in a remote storage location or local client device of the participant. For example, an MP4 video file may be automatically generated on a remote server, and provided for download by the participant for offline viewing whenever the user wishes. Similarly, a number of images corresponding to visual slides presented during the communication session may be provided for the participant to download and store on their local device.

In some embodiments, upon preventing the current portion of session content from being captured, the system sends a notification to one or more of: the requesting participant, one or more presenting participants, and/or one or more hosts or administrators of the communication session. For example, upon a participant requesting a note to be captured and the system preventing the note from being captured, the system can send a notification to the UI shown to the participant who requested the note to be captured. The notification can include, for example, text notifying the participant that the current portion of session content cannot be captured. In some embodiments, additional information is provided in the notification, such as which specific content is being prevented from capture. In some embodiments, an additional notification may appear for the user when session content once again becomes available for capture. Presenting participants may also wish to receive notifications when participants attempt to capture notes but are prevented from doing so, for a variety of reasons including, for example, having some data on which protected or confidential slides are considered noteworthy by participants.

In some embodiments, the system prevents capture of the current portion of the session content for one or more unauthorized users, but one or more authorized users are still permitted to capture the current portion of the session content based on configurable permissions controls. Users may thus be authorized to capture content, or unauthorized to capture content. In some embodiments, a presenting participant, administrator, or host may establish or modify permissions for one or more participants in the session, or potentially globally for participant(s) across multiple sessions, via configurable permissions settings for participants which may be present within a settings or preferences UI. In some embodiments, participants may be able to establish such permissions on a granular level, including defining specific pieces of content that a given participant is permitted or prevented from capturing within a session.

Figure 3:
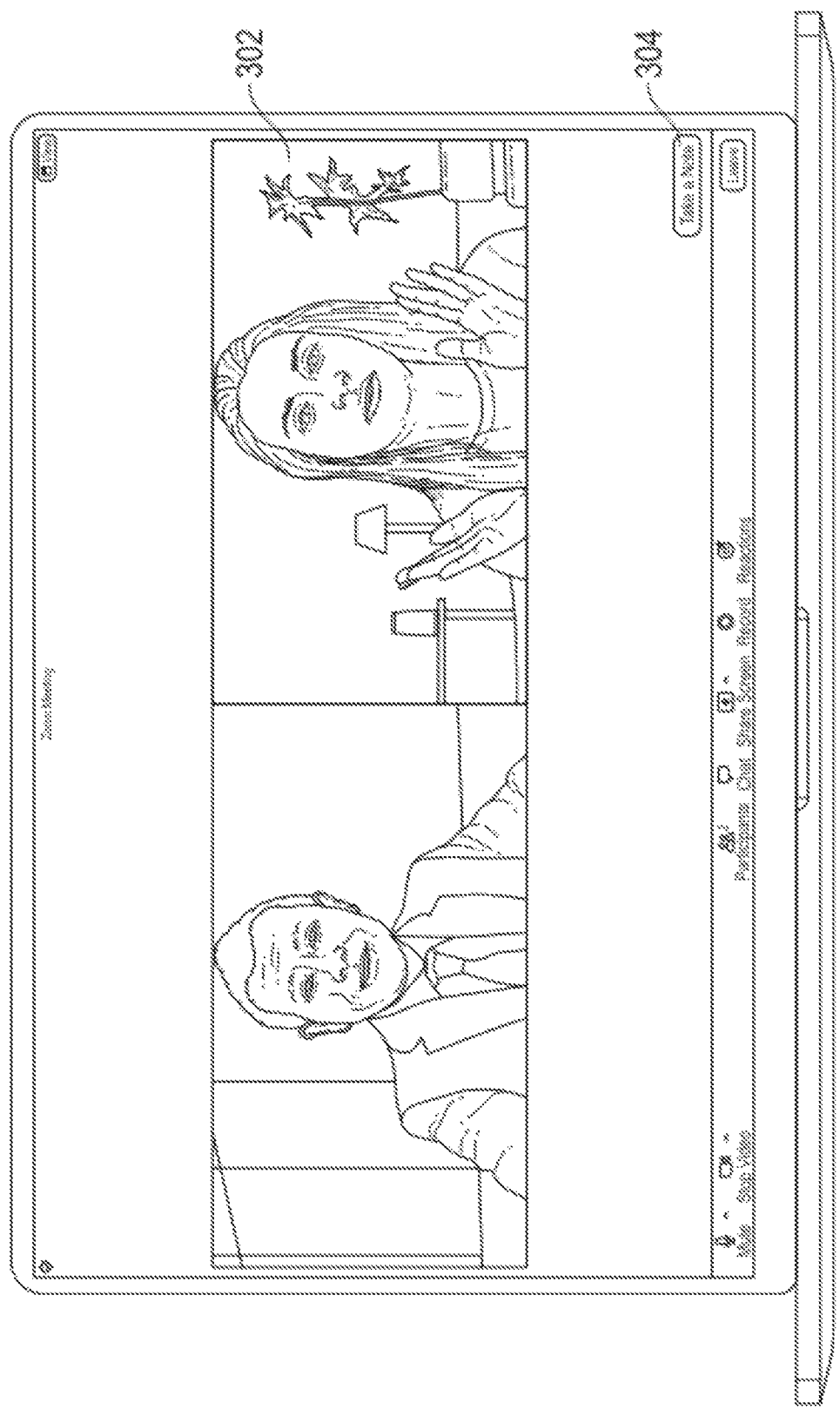
FIG. 3 is a diagram illustrating one example embodiment of a user interface (hereinafter "UI") for a communication session with a capture request UI element, according to some embodiments.

FIG. 3 is a diagram illustrating one example embodiment of a user interface (hereinafter "UI") for a communication session with a note generation UI element, according to some embodiments.

The illustration depicts a UI that a particular participant is viewing on a screen of the participant's client device. Two participant windows 302 are displayed within the UI, side by side. Within each participant window is a video. The video in each of the participant windows is a live video feed captured via a camera or other device that is either built into or connected to the client device of that participant, then streamed to the UIs of participants. Also appearing in the bottom right corner of the UI is a UI element 304 labeled "Take a Note," which represents a selectable UI element for the participant to request a note to be generated. The participant can choose to click on, or otherwise interact with this UI element. Upon interacting with the element, the system receives a request for a note to be generated by that requesting participant. In some embodiments, a note UI may then appear for the participant to customize the note or add annotations to the note. In other embodiments, the system may simply generate the note without requiring any additional input from the participant.

In some embodiments, a UI element may not need to be selected in order for a note request to be initiated. For example, as described above, the system may automatically initiate a request to generate a note for the participant upon detecting or receiving indication of one or more automated note taking conditions. A note or several notes can thus be generated without any manual input from the participant.

Figure 4:
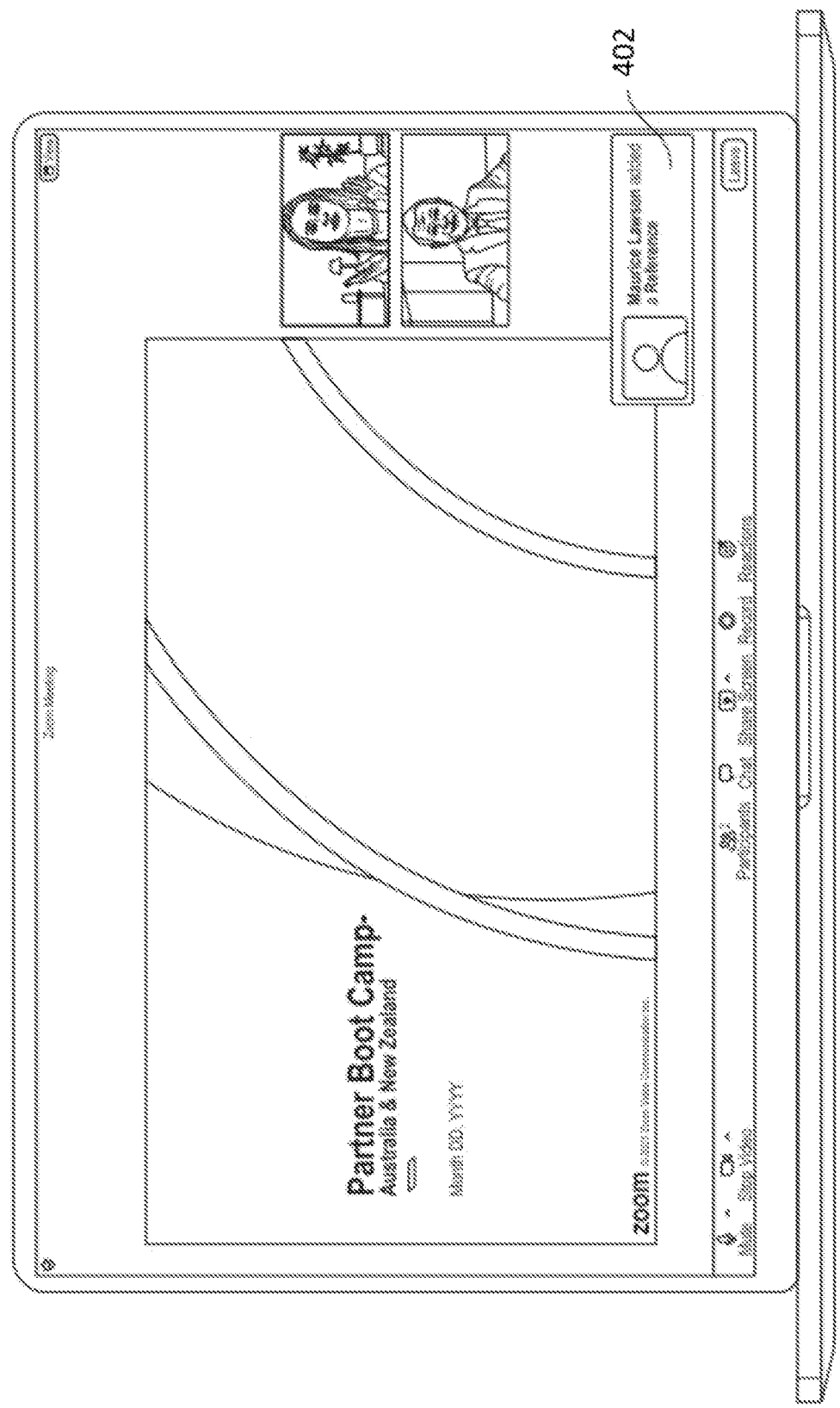
FIG. 4 is a diagram illustrating one example embodiment of a notification of capture being activated, according to some embodiments.

FIG. 4 is a diagram illustrating one example embodiment of a notification of capture being activated, according to some embodiments.

Within the illustration, the participant is viewing a communication session UI and viewing the session content of a communication session as two presenters talk and appear on video. A notification 402 appears on the bottom right of the UI, informing the participant that "Maurice Lawson added a Reference." This informs the participant that another participant in the communication session has requested capture, that capture occurred, and that the system categorized the capture as a "reference." In some cases, this notification may be helpful for participants to understand when other participants are taking notes on material, as it may indicate that such material is noteworthy.

Figure 5:
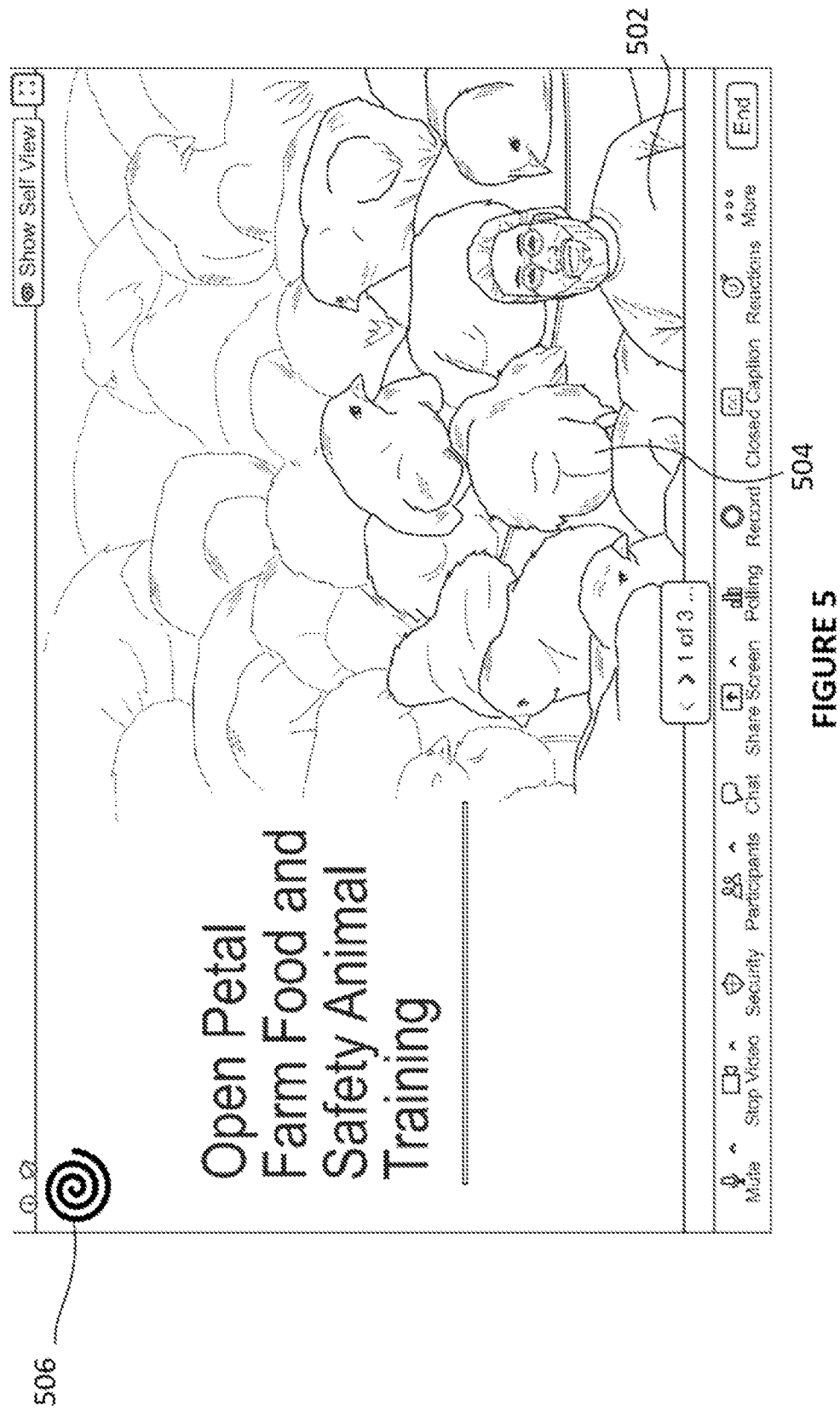
FIG. 5 is a diagram illustrating one example embodiment of a UI for preventing capture.

FIG. 5 is a diagram illustrating one example embodiment of a UI for preventing capture.

The illustrated example depicts a presentation being delivered by a presenter during a remote capture session. Specifically, a presenter is giving a live streaming presentation. Behind the video of the presenter 502 is a media background 504. The media background 504 is provided as a presentation consisting of a number of slides. The presentation slide was selected by the presenter from a local storage drive of the presenter's client device. The title slide is depicted in the example as the presenter speaks in front of the slide.

A visual indicator 506 is provided in the upper left corner of the slide, which may be represented as a glyph, symbol, graphic, or other visual indication or signal that capture should be prevented for the slide. The system periodically, semi-periodically, or continuously monitors the session content with one or more machine vision, machine learning, or other AI models to detect such visual indicators. Upon recognizing the visual indicator, capture is prevented for participants within the meeting.

Figure 6:
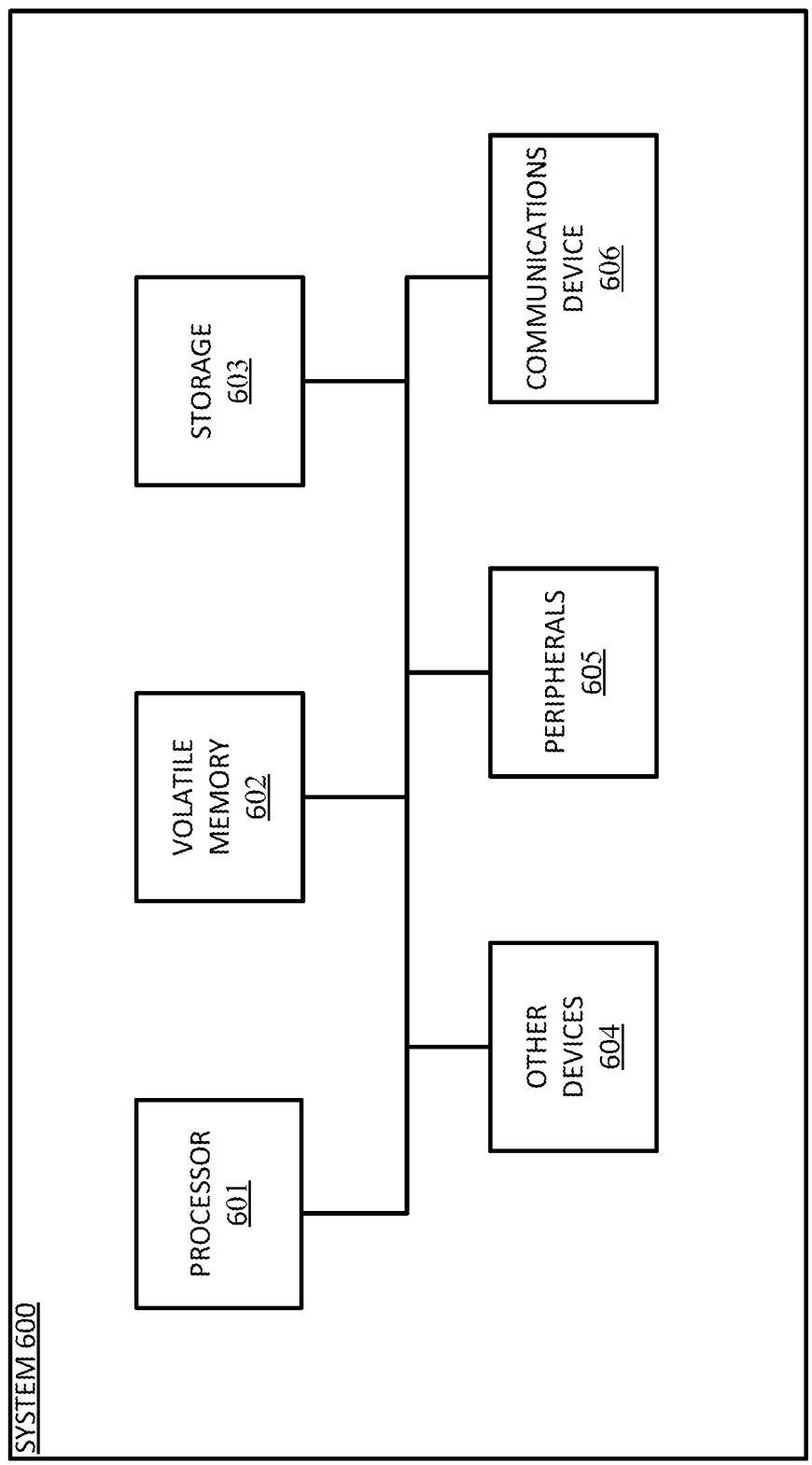
FIG. 6 is a diagram illustrating an exemplary computer that may perform processing in some embodiments.

FIG. 6 is a diagram illustrating an exemplary computer that may perform processing in some embodiments. Exemplary computer 600 may perform operations consistent with some embodiments. The architecture of computer 600 is exemplary. Computers can be implemented in a variety of other ways. A wide variety of computers can be used in accordance with the embodiments herein.

Processor 601 may perform computing functions such as running computer programs. The volatile memory 602 may provide temporary storage of data for the processor 601. RAM is one kind of volatile memory. Volatile memory typically requires power to maintain its stored information. Storage 603 provides computer storage for data, instructions, and/or arbitrary information. Non-volatile memory, which can preserve data even when not powered and including disks and flash memory, is an example of storage. Storage 603 may be organized as a file system, database, or in other ways. Data, instructions, and information may be loaded from storage 603 into volatile memory 602 for processing by the processor 601.

The computer 600 may include peripherals 605. Peripherals 605 may include input peripherals such as a keyboard, mouse, trackball, video camera, microphone, and other input devices. Peripherals 605 may also include output devices such as a display. Peripherals 605 may include removable media devices such as CD-R and DVD-R recorders/players. Communications device 606 may connect the computer 100 to an external medium. For example, communications device 606 may take the form of a network adapter that provides communications to a network. A computer 600 may also include a variety of other devices 604. The various components of the computer 600 may be connected by a connection medium such as a bus, crossbar, or network.

It will be appreciated that the present disclosure may include any one and up to all of the following examples.

Example 1. A method, comprising: maintaining a communication session with a plurality of participants, wherein session content is presented during the communication session to the plurality of participants, and wherein participants can request the session content to be captured for later access; receiving or identifying one or more signals for capture prevention to be initiated for at least a portion of the session content; receiving, in real time during the communication session, a request from one of the participants for a current portion of session content to be captured; determining, via processing of the one or more signals, that the current portion of session content is to be prevented from capture; and preventing the current portion of session content from being captured.

Example 2. The method of example 1, wherein a capture duration for the current portion of the session content requested to be captured is one of: a predefined capture duration, a capture duration which is determined based on the content, and a capture duration which is user-defined by one or more authorized participants.

Example 3. The method of any of examples 1-2, wherein the one or more signals specify that the at least a portion of the session content comprises one or more presentation slides to be prevented from capture on a per-slide basis.

Example 4. The method of any of examples 1-3, wherein receiving or identifying one or more signals for capture prevention to be initiated for at least a portion of the session content comprises: identifying and classifying, via one or more artificial intelligence (AI) models, one or more indicators in the session content comprising video, image, and/or audio data, wherein the one or more AI models are trained to determine that the one or more indicators represent the one or more signals that capture prevention should be initiated.

Example 5. The method of example 4, wherein at least one of the indicators is a digital watermark or one or more properties associated with a portion of image, video, and/or audio content.

Example 6. The method of any of examples 4-5, wherein at least one of the indicators is a
graphic which has been selected by a user from one or more predefined graphic options.

Example 7. The method of any of examples 4-6, wherein: at least one of the indicators is a user-submitted graphic; and wherein the one or more AI models identify the user-submitted graphic by identifying a prespecified bounding box or border which the graphic is situated inside of.

Example 8. The method of any of examples 4-7, wherein: at least one of the indicators is an audio-based prompt from a participant; and wherein the one or more AI models identify the audio-based prompt by: monitoring speech content within the session to identify speech which indicates that the current portion of the session content is confidential, sensitive, and/or protected, associating the speech with the participant, and determining that the participant is authorized to prevent capture of the current portion of the session content.

Example 9. The method of any of examples 4-8, wherein at least one of the indicators is a pixel map overlaid on presented image and/or video content.

Example 10. The method of any of examples 1-9, wherein the one or more signals for capture prevention to be initiated comprise information on a specified region of the screen to be prevented from capture, and wherein preventing the current portion of session content from being captured comprises preventing the specified region of the screen from being captured for that current portion of session content.

Example 11. The method of any of examples 1-10, further comprising: upon preventing the current portion of session content from being captured, sending a notification to one or more of: the requesting participant, one or more presenting participants, and/or one or more hosts or administrators of the communication session.

Example 12. The method of any of examples 1-11, wherein receiving or identifying one or more signals for capture prevention to be initiated for at least a portion of the session content comprises: receiving a signal that a currently presenting participant, a host, or an administrator of the communication session has sent a message to a chatbot pertaining to capture prevention within the communication session.

Example 13. The method of any of examples 1-12, wherein preventing the current portion of session content from being captured comprises: preventing capture of the current portion of the session content for one or more unauthorized users, where one or more authorized users are still permitted to capture the current portion of the session content based on configurable permissions controls.

Example 14. The method of any of examples 1-13, wherein receiving or identifying one or more signals for capture prevention to be initiated for at least a portion of the session content comprises: receiving a signal that a currently presenting participant, a host, or an administrator of the communication session has toggled a user interface (UI) element to initiate a secured content mode for the communication session, where session content is prevented from being captured while the secured content mode is active.

Example 15. The method of any of examples 1-14, wherein the communication session is locked such that no new participants may join while the secured content mode is active.

Example 16. The method of any of examples 1-15, wherein determining that the current portion of session content is to be prevented from capture comprises: classifying, via one or more AI models, the current portion of session content as sensitive or protected content.

Example 17. The method of any of example 16, wherein receiving or identifying one or more signals for capture prevention to be initiated for at least a portion of the session content comprises performing one or more real-time optical character recognition (OCR) techniques on the session content to recognize one or more textual keywords.

Example 18. The method of any of examples 1-17, wherein receiving or identifying one or more signals for capture prevention to be initiated for at least a portion of the session content comprises: receiving one or more user preferences which configure one or more applications for capture prevention on a per-application basis.

Example 19. A communication system comprising one or more processors configured to perform the operations of: maintaining a communication session with a plurality of participants, wherein session content is presented during the communication session to the plurality of participants, and wherein participants can request the session content to be captured for later access; receiving or identifying one or more signals for capture prevention to be initiated for at least a portion of the session content; receiving, in real time during the communication session, a request from one of the participants for a current portion of session content to be captured; determining, via processing the one or more signals, that the current portion of session content is to be prevented from capture; and preventing the current portion of session content from being captured.

Example 20. The communication system of example 19, wherein a capture duration for the current portion of the session content requested to be captured is one of: a predefined capture duration, a capture duration which is determined based on the content, and a capture duration which is user-defined by one or more authorized participants.

Example 21. The communication system of any of examples 19-20, wherein the one or more signals specify that the at least a portion of the session content comprises one or more presentation slides to be prevented from capture on a per-slide basis.

Example 22. The communication system of any of examples 19-21, wherein receiving or identifying one or more signals for capture prevention to be initiated for at least a portion of the session content comprises: identifying and classifying, via one or more artificial intelligence (AI) models, one or more indicators in the session content comprising video, image, and/or audio data, wherein the one or more AI models are trained to determine that the one or more indicators represent the one or more signals that capture prevention should be initiated.

Example 23. The communication system of example 22, wherein at least one of the indicators is a digital watermark or one or more properties associated with a portion of image, video, and/or audio content.

Example 24. The communication system of any of examples 22-23, wherein at least one of the indicators is a graphic which has been selected by a user from one or more predefined graphic options.

Example 25. The communication system of any of examples 22-24, wherein: at least one of the indicators is a user-submitted graphic; and wherein the one or more AI models identify the user-submitted graphic by identifying a prespecified bounding box or border which the graphic is situated inside of Example 26. The communication system of any of examples 22-25, wherein: at least one of the indicators is an audio-based prompt from a participant; and wherein the one or more AI models identify the audio-based prompt by: monitoring speech content within the session to identify speech which indicates that the current portion of the session content is confidential, sensitive, and/or protected, associating the speech with the participant, and determining that the participant is authorized to prevent capture of the current portion of the session content.

Example 27. The communication system of any of examples 22-26, wherein at least one of the indicators is a pixel map overlaid on presented image and/or video content.

Example 28. The communication system of any of examples 19-27, wherein the one or more signals for capture prevention to be initiated comprise information on a specified region of the screen to be prevented from capture, and wherein preventing the current portion of session content from being captured comprises preventing the specified region of the screen from being captured for that current portion of session content.

Example 29. The communication system of any of examples 19-28, further comprising: upon preventing the current portion of session content from being captured, sending a notification to one or more of: the requesting participant, one or more presenting participants, and/or one or more hosts or administrators of the communication session.

Example 30. The communication system of any of examples 19-29, wherein receiving or identifying one or more signals for capture prevention to be initiated for at least a portion of the session content comprises: receiving a signal that a currently presenting participant, a host, or an administrator of the communication session has sent a message to a chatbot pertaining to capture prevention within the communication session.

Example 31. The communication system of any of examples 19-30, wherein preventing the current portion of session content from being captured comprises: preventing capture of the current portion of the session content for one or more unauthorized users, where one or more authorized users are still permitted to capture the current portion of the session content based on configurable permissions controls.

Example 32. The communication system of any of examples 19-31, wherein receiving or identifying one or more signals for capture prevention to be initiated for at least a portion of the session content comprises: receiving a signal that a currently presenting participant, a host, or an administrator of the communication session has toggled a user interface (UI) element to initiate a secured content mode for the communication session, where session content is prevented from being captured while the secured content mode is active.

Example 33. The communication system of example 32, wherein the communication session is locked such that no new participants may join while the secured content mode is active.

Example 34. The communication system of any of examples 19-33, wherein determining that the current portion of session content is to be prevented from capture comprises: classifying, via one or more AI models, the current portion of session content as sensitive or protected content.

Example 35. The communication system of any of examples 19-34, wherein receiving or identifying one or more signals for capture prevention to be initiated for at least a portion of the session content comprises performing one or more real-time optical character recognition (OCR) techniques on the session content to recognize one or more textual keywords.

Example 36. The communication system of any of examples 19-35, wherein receiving or identifying one or more signals for capture prevention to be initiated for at least a portion of the session content comprises: receiving one or more user preferences which configure one or more applications for capture prevention on a per-application basis.

Example 37. A non-transitory computer-readable medium containing instructions for generating a note with session content from a communication session, comprising: instructions for maintaining a communication session with a plurality of participants, wherein session content is presented during the communication session to the plurality of participants, and wherein participants can request the session content to be captured for later access; instructions for receiving or identifying one or more signals for capture prevention to be initiated for at least a portion of the session content; instructions for receiving, in real time during the communication session, a request from one of the participants for a current portion of session content to be captured; instructions for determining, via processing the one or more signals, that the current portion of session content is to be prevented from capture; and instructions for preventing the current portion of session content from being captured.

Example 38. The non-transitory computer-readable medium of example 37, wherein a capture duration for the current portion of the session content requested to be captured is one of: a predefined capture duration, a capture duration which is determined based on the content, and a capture duration which is user-defined by one or more authorized participants.

Example 39. The non-transitory computer-readable medium of any of examples 37-38, wherein the one or more signals specify that the at least a portion of the session content comprises one or more presentation slides to be prevented from capture on a per-slide basis.

Example 40. The non-transitory computer-readable medium of any of examples 37-39, wherein receiving or identifying one or more signals for capture prevention to be initiated for at least a portion of the session content comprises: identifying and classifying, via one or more artificial intelligence (AI) models, one or more indicators in the session content comprising video, image, and/or audio data, wherein the one or more AI models are trained to determine that the one or more indicators represent the one or more signals that capture prevention should be initiated.

Example 41. The non-transitory computer-readable medium of example 40, wherein at least one of the indicators is a digital watermark or one or more properties associated with a portion of image, video, and/or audio content.

Example 42. The non-transitory computer-readable medium of any of examples 40-41, wherein at least one of the indicators is a graphic which has been selected by a user from one or more predefined graphic options.

Example 43. The non-transitory computer-readable medium of any of examples 40-42, wherein: at least one of the indicators is a user-submitted graphic; and wherein the one or more AI models identify the user-submitted graphic by identifying a prespecified bounding box or border which the graphic is situated inside of.

Example 44. The non-transitory computer-readable medium of any of examples 40-43, wherein: at least one of the indicators is an audio-based prompt from a participant; and wherein the one or more AI models identify the audio-based prompt by: monitoring speech content within the session to identify speech which indicates that the current portion of the session content is confidential, sensitive, and/or protected, associating the speech with the participant, and determining that the participant is authorized to prevent capture of the current portion of the session content.

Example 45. The non-transitory computer-readable medium of any of examples 40-44, wherein at least one of the indicators is a pixel map overlaid on presented image and/or video content.

Example 46. The non-transitory computer-readable medium of any of examples 37-45, wherein the one or more signals for capture prevention to be initiated comprise information on a specified region of the screen to be prevented from capture, and wherein preventing the current portion of session content from being captured comprises preventing the specified region of the screen from being captured for that current portion of session content.

Example 47. The non-transitory computer-readable medium of any of examples 37-50, further comprising: upon preventing the current portion of session content from being captured, sending a notification to one or more of: the requesting participant, one or more presenting participants, and/or one or more hosts or administrators of the communication session.

Example 48. The non-transitory computer-readable medium of any of examples 37-51, wherein receiving or identifying one or more signals for capture prevention to be initiated for at least a portion of the session content comprises: receiving a signal that a currently presenting participant, a host, or an administrator of the communication session has sent a message to a chatbot pertaining to capture prevention within the communication session.

Example 49. The non-transitory computer-readable medium of any of examples 37-52, wherein preventing the current portion of session content from being captured comprises: preventing capture of the current portion of the session content for one or more unauthorized users, where one or more authorized users are still permitted to capture the current portion of the session content based on configurable permissions controls.

Example 50. The non-transitory computer-readable medium of any of examples 37-53, wherein receiving or identifying one or more signals for capture prevention to be initiated for at least a portion of the session content comprises: receiving a signal that a currently presenting participant, a host, or an administrator of the communication session has toggled a user interface (UI) element to initiate a secured content mode for the communication session, where session content is prevented from being captured while the secured content mode is active.

Example 51. The non-transitory computer-readable medium of example 50, wherein the communication session is locked such that no new participants may join while the secured content mode is active.

Example 52. The non-transitory computer-readable medium of any of examples 37-51, wherein determining that the current portion of session content is to be prevented from capture comprises: classifying, via one or more AI models, the current portion of session content as sensitive or protected content.

Example 53. The non-transitory computer-readable medium of example 52, wherein receiving or identifying one or more signals for capture prevention to be initiated for at least a portion of the session content comprises performing one or more real-time optical character recognition (OCR) techniques on the session content to recognize one or more textual keywords.

Example 54. The non-transitory computer-readable medium of any of examples 37-53, wherein receiving or identifying one or more signals for capture prevention to be initiated for at least a portion of the session content comprises: receiving one or more user preferences which configure one or more applications for capture prevention on a per-application basis.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A method, comprising:
    maintaining a communication session with a plurality of participants, wherein session content is presented during the communication session to the plurality of participants, and wherein the session content is captured for later access;
    receiving one or more signals configured to prevent capture on a per-slide basis of at least a portion of the session content that comprises one or more presentation slides;
    receiving, in real time during the communication session, a request from one of the plurality of participants to capture a current portion of the session content; and
    preventing capture of the current portion of the session content based on the one or more signals.

2. The method of claim 1, wherein receiving one or more signals configured to prevent capture comprises:
    identifying and classifying, via one or more artificial intelligence (AI) models, one or more indicators in the session content comprising video, image, and/or audio data,
    wherein the one or more AI models are trained to determine that the one or more indicators represent the one or more signals configured to prevent capture.

3. The method of claim 2, wherein at least one of the indicators is a digital watermark or one or more properties associated with a portion of image, video, and/or audio content.

4. The method of claim 2, wherein at least one of the indicators is a graphic which has been selected by a user from one or more predefined graphic options.

5. The method of claim 2, wherein:
    at least one of the indicators is a user-submitted graphic; and
    wherein the one or more AI models identify the user-submitted graphic by identifying a prespecified bounding box or border which the graphic is situated inside of.

6. The method of claim 2, wherein:
    at least one of the indicators is an audio-based prompt from a participant; and
    wherein the one or more AI models identify the audio-based prompt by:
        monitoring speech content within the session to identify speech which indicates that the current portion of the session content is confidential, sensitive, and/or protected,
        associating the speech with the participant, and
        determining that the participant is authorized to prevent capture of the current portion of the session content.

7. The method of claim 2, wherein at least one of the indicators is a pixel map overlaid on presented image and/or video content.

8. The method of claim 1, wherein the one or more signals configured to prevent capture prevention to be initiated comprise information on a specified region of the screen where capture is prevented, and
    wherein preventing capture of the current portion of the session content comprises preventing capture of the specified region of the screen for that current portion of session content.

9. The method of claim 1, further comprising:
    upon preventing capture of the current portion of the session content, sending a notification to one or more of: the requesting participant, one or more presenting participants, and/or one or more hosts or administrators of the communication session.

10. The method of claim 1, wherein receiving one or more signals configured to prevent capture comprises:
    receiving a signal that a currently presenting participant, a host, or an administrator of the communication session has sent a message to a chatbot pertaining to capture prevention within the communication session.

11. The method of claim 1, wherein preventing capture of the current portion of the session content comprises:
    preventing capture of the current portion of the session content for one or more unauthorized users, where one or more authorized users are still permitted to capture the current portion of the session content based on configurable permissions controls.

12. The method of claim 1, wherein receiving one or more signals configured to prevent capture comprises:
    receiving a signal that a currently presenting participant, a host, or an administrator of the communication session has toggled a user interface (UI) element to initiate a secured content mode for the communication session, where session content is prevented from being captured while the secured content mode is active.

13. The method of claim 12, wherein the communication session is locked such that no new participants may join while the secured content mode is active.

14. A communication system comprising one or more processors configured to perform the operations of:
    maintaining a communication session with a plurality of participants, wherein session content is presented during the communication session to the plurality of participants, and wherein the session content can be captured for later access;
    receiving one or more signals configured to prevent capture on a per-slide basis of at least a portion of the session content that comprises one or more presentation slides;
    receiving, in real time during the communication session, a request from one of the plurality of participants to capture a current portion of the session content; and
    preventing capture of the current portion of the session content based on the one or more signals.

15. The communication system of claim 14, further comprising determining that the current portion of session content is to be prevented from capture by
    classifying, via one or more AI models, the current portion of the session content as sensitive or protected content.

16. The communication system of claim 15, wherein receiving one or more signals configured to prevent capture comprises performing one or more real-time optical character recognition (OCR) techniques on the session content to recognize one or more textual keywords.

17. The communication system of claim 14, wherein receiving one or more signals configured to prevent capture comprises:
- receiving one or more user preferences which configure one or more applications for capture prevention on a per-application basis.

18. A non-transitory computer-readable medium containing instructions for generating a note with session content from a communication session, comprising:
- instructions for maintaining a communication session with a plurality of participants, wherein session content is presented during the communication session to the plurality of participants, and wherein the session content can be captured for later access;
- instructions for receiving one or more signals configured to prevent capture on a per-slide basis of at least a portion of the session content that comprises one or more presentation slides;
- instructions for receiving, in real time during the communication session, a request from one of the plurality of participants to capture a current portion of the session content;
and
- instructions for preventing capture of the current portion of the session content based on the one or more signals.

* * * * *